United States Patent Office 3,337,510
Patented Aug. 22, 1967

3,337,510
ORGANOSILICON COMPOSITIONS AND METHODS FOR PREPARING THE SAME
Johann F. Klebe, Schenectady, N.Y., assignor to General Electric Company, a corporation of New York
No Drawing. Filed May 28, 1964, Ser. No. 371,128
10 Claims. (Cl. 260—77.5)

ABSTRACT OF THE DISCLOSURE

Polysilylbiurets which can be desilylated to form polybiurets are prepared by the reaction of an organic diisocyanate and an organosilylamine.

---

This invention is concerned with polysilylbiurets, their preparation, and their conversion to polybiurets. More particularly, the invention relates to the aforesaid polymeric biurets, and a process for making polysilylbiurets which comprises effecting reaction between a diisocyanate of the formula (I)      OCN—R—NCO with an organosilylamine of the formula (II) 

to obtain compositions of the formula (III) 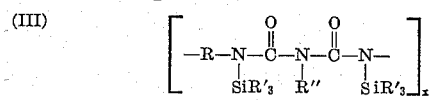

which upon desilylation (e.g. by hydrolysis) will yield polybiurets of the formula (IV) 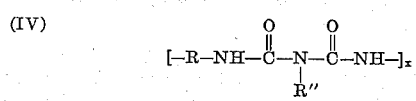

and a disiloxane of the formula R′$_3$Si—O—Si—R′$_3$, where R is a divalent organic radical, R′ is a monovalent hydrocarbon radical, R″ is a monovalent hydrocarbon radical selected from the class consisting of alkyl, alkenyl, and cycloaliphatic radiacls and $x$ is a whole number in excess of 1, for example, 10 to 100,000 or more.

It can thus be seen that the composition aspects of this invention are directed to compositions of the formula (V) 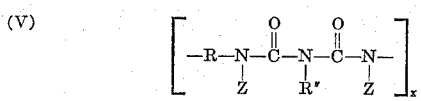

where R, R″ and $x$ have the meanings given above, and Z is a member of the class of hydrogen and the —SiR′$_3$ radical, where R′ has the meaning above.

Polybiurets of Formula IV and polysilylbiurets of Formula III are to the best of my knowledge unknown in the prior art, nor have methods been previously described for preparing the same. I have unexpectedly discovered that I am able to obtain polysilylbiurets (and by hydrolysis of the latter obtain polybiurets) at around room temperature in relatively short periods of time and that the products thus obtained are in a highly pure state. The polysilylbiurets have melting points ranging from about 75–200° C. Hydrolysis of the polysilylbiurets yields polybiurets which, although insoluble in solvents such as alcohols, ethers, aromatic hydrocarbons and halogenated hydrocarbons, are nevertheless quite soluble in dimethylsulfoxide and dimethylformamide. Moreover, these polybiurets have the unusual property of not having melting points but are fairly stable at temperatures as high as 350° C. at which point they begin to show some evidence of decomposition without melting.

It is accordingly one of the objects of this invention to obtain polysilylbiurets of Formula III advantageously having melting points in excess of 75° C.

It is another object of the invention to obtain polybiurets of relatively high molecular weight from the aforesaid polysilylbiurets by hydrolysis of the latter.

A still further object of the invention is to obtain polybiurets which are soluble in a number of readily available solvents yet are infusible at temperatures of from 200–300° C.

Other objects of the invention will become more apparent from the discussion which follows:

The attainment of the aforesaid objectives is based on the preparation of a polysilylbiuret precursor of the Formula III which in the presence of moisture is readily hydrolyzed to form the polybiuret and the aforesaid disiloxane. This disiloxane can either be volatilized from the polybiuret or can advantageously be used, for instance, when forming films or fibers, to induce water repellency or lubrication of the final polybiuret article.

In preparing the polybiurets, I first prepare a polysilylbiuret of Formula III from the reaction of a diisocyanate of Formula I with an organosilylamine of Formula II. In general, the reaction of the silyl-substituted amine of Formula II and the diisocyanate are carried out in the presence of a solvent at temperatures preferably (although not necessarily) somewhat in excess of room temperature for a sufficient time until the polysilylbiuret is formed, and thereafter the polysilylbiuret is separated and can then be used in this form or can be converted to the polybiuret by subjecting it to hydrous conditions, e.g., by treating it with an atmosphere containing water.

Among the divalent (both substituted and unsubstituted) organic radicals which R may be are, for instance, alkylene radicals (e.g., ethylene (—CH$_2$CH$_2$—), propylene, isopropylene (—CH$_2$—CH(CH$_3$)—, amylene including all of is isomeric forms, butylene including all of its isomeric forms, etc.); arylene radicals (e.g., phenylene, biphenylene, naphthylene, etc.); aralkylene radicals (e.g., phenylethylene, diphenylpropylene, etc.); alkarylene radicals (e.g., tolylene, xylylene, etc.); aryl ether radicals (e.g., radicals of the formula

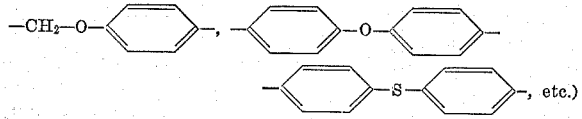

Where R is an arylene radical, any substituents thereon can be in any of the positions vicinal, symmetrical and asymmetrical to the valences of the arylene radical connected to the isocyanate (—NCO) radicals. The valences of the arylene group may be varied in ortho-, meta-, or para-positions with the meta- or para-positions being the preferred arrangement.

Among compositions which the diisocyanates of Formula I may be are, for instance, ethylene diisocyanate, 1,2 - diisocyanatopropane, butylene diisocyanate, pentamethylene diisocyanate, phenylene diisocyanate, toluene diisocyanate, naphthalene diisocyanate (where the isocyanato groups may be alpha or beta-substituted on the same or different aryl members of the naphthalene nucleus), xylene diisocyanate; p,p′-diisocyanato diphenyloxide; para,para′-diisocyanato diphenylmethane, etc. The presence of inert substituents on the aryl nucleus of aryl diisocyanates, for example, halogens (e.g., chlorine, bromine, etc.), nitro group, cyano group, ester groups, as well as other hydrocarbon radicals such as alkyl, aryl, aralkyl and alkaryl radicals, is not precluded. It is essential that there be no substitution on the R group of reactive groups, such as an amine, a hydroxy, a carboxy, or similar reactive atoms or group.

Among the hydrocarbon radicals which R' may be are, for instance, alkyl radicals (e.g., methyl, ethyl, propyl, isopropyl, pentyl, octyl, dodecyl, etc., radicals); alkenyl radicals (e.g., vinyl, allyl, crotyl, etc. radicals); aryl radicals (e.g., phenyl, naphthyl, biphenyl, etc., radicals); aralkyl radicals (e.g., benzyl, phenylethyl, etc., radicals); alkaryl radicals (e.g., xylyl, tolyl, ethylphenyl, methylnaphthyl, etc., radicals); cycloaliphatic, including unsaturated radicals (e.g., cyclopentyl, cyclohexyl, cyclopentenyl, cyclohexenyl, etc., radicals); etc. The presence again of inert substituents (i.e., inert to the reactants and the reaction product) on the organic radicals as, for instance, halogen groups, the nitro group, etc., is not precluded. R'' can be any of the monovalent hydrocarbon radicals selected from the class consisting of alkyl, alkenyl, aralkyl, and cycloaliphatic radicals, many examples of which have been given above for the radicals recited for R'.

The triorganosilyl amines of Formula II can be prepared by reacting a monoamine of the formula R''NH$_2$ with a triorganohydrolyzable silane of the formula $$R_3'Si—X$$

where R' and R'' have the meanings given above, and X is a halogen, for example, chlorine, bromine, iodine, etc. Among the triorganohydrolyzable silanes which may be employed are, for instance, trimethylchlorosilane, triphenylchlorosilane, methyldiethylbromosilane, trixylylchlorosilane, tritolylbromosilane, triethylchlorosilane, tribenzylchlorosilane, etc.

Among the monoamines which may be used to make the triorganosilylamines of Formula II may be mentioned, for instance, methylamine, ethylamine, propylamine, isopropylamine, butylamine, octylamine, phenethylamine, benzylamine, allylamine, methallylamine, cyclohexylamine, etc.

In making the triorganosilylamine of Formula II, a molar ratio of at least 2 and up to 6 or more moles of the aforesaid triorganohydrolyzable silane is reacted with 1 mole of the monoamine preferably in the presence of a non-polar solvent such as benzene, toluene, xylene, dioxane, etc. under anhydrous conditions at temperatures from slightly above room temperature up to the reflux temperature of the mass. The triorganohydrolyzable silane, such as trimethylchlorosilane, when added to the diamino compound, in the presence of a hydrohalide acceptor such as pyridine, triethylamine, etc., or some other tertiary amine, usually results in an exothermic reaction with the temperature rising as high as 40–70° C. The mixture of ingredients is advantageously stirred for a period of from about one half to two hours and thereafter heated at the reflux temperature of the mass for an additional period of 15 minutes to 1 hour and the hydrohalide of the hydrohalide acceptor is then filtered off and the reaction product thereafter fractionally distilled to isolate the desired triorganosilyl amine of Formula II.

In order to from the polysilylbiuret, the diisocyanate is then reacted with the triorganosilylamine of Formula II employing a molar ratio of about 1 mol of the triorganosilylamine per mol of the diisocyanate. The mixture is then advantageously heated under anhydrous conditions at a temperature of from about 35–150° C. (usually at the reflux temperaturre of the mass), advantageously in a non-polar solvent, examples of which have been mentioned above, and in the presence of an inert atmosphere for periods of time ranging from about 2–5 hours or more. There is thus obtained a solution of the desired polysilylbiuret which can be precipitated from the solvent by the addition of a non-solvent for the polysilylbiuret, such as n-hexane.

Polysilylbiurets of Formula III can be dissolved in a solvent (for example, benzene, toluene, tetrahydrofuran, etc.) and tough, clear, colorless films may be cast from such solutions. Alternatively, the solutions may be used to spin fibers through spinnerettes into a heated atmosphree whereby the solvent is volatilized leaving behind fibers of the polysilylbiuret. These polysilylbiurets of Formula III can have molecular weights ranging as low as 1000 to as high as 500,000 or more. Such polymers depending on the substituents which R, R', R'' and X may represent, will have elevated softening points many of which will be around 175–250° C. or higher. By exposing these polysilylbiurets (in whatever form they may be, e.g., in film form, etc.) to hydrolysis, it is possible to convert the polysilylbiurets to the unsilylated biurets of Formula IV of molecular weights in excess of 1000 and having good heat and solvent resistance.

The formation of the polybiuret containing fewer silyl groups than the starting polysilylurea or a polybiuret completely free of silyl groups can be accomplished by exposing the polysilylbiuret to air, preferably of high humidity of from 70 to 100% relative humidity. This effects hydrolysis of the triorganosilyl groups to form the corresponding triorganosilanol, with the substitution of a hydrogen atom in place of the triorganosilyl group on a nitrogen atom. Where the polysilylbiuret is fairly thick in cross-section, the removal of the triorganosilyl groups by hydrolysis is more rapid at the surface than in the matrix of the polysilylbiuret article. The formation of solutions of the polysilylbiuret and thereafter washing the solutions with water will effect essentially complete removal of the triorganosilyl groups. After the treatment with the moisture or water-containing environment, the polybiuret is advantageously washed with suitable solvents to remove the disiloxane (if this is so desired) or it can be subjected to temperatures sufficiently high to volatilize the disiloxane.

In order that those skilled in the art may better understand how the present invention may be practiced, the following examples are given by way of illustration and not by way of limitation. All parts are by weight unless otherwise stated.

*Example 1*

A mixture of 1.60 grams of p-phenylene di-isocyanate and 1.75 grams of N-methylhexamethyldisilazane [also known as bis(trimethylsilyl) methylamine and prepared by the process described by Osthoff and Kantor, Inorg. Synth., 5, p. 55], in 3.0 grams of dry tetrahydrofuran was stirred under anhydrous conditions for about 72 hours at about 35° C. The solution of relatively high viscosity which was obtained, was diluted with 5 cc. of tetrahydrofuran and then added with stirring to 50 cc. of dry n-hexane. A white precipitate was obtained which was removed by filtration, washed with n-hexane and dried. This polymer, which had the formula (VI) 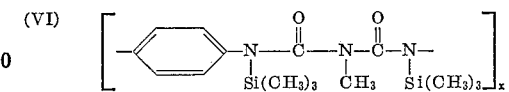

where $x$ is a whole number in excess of 1, melted within the range of 110–120° C. and had a molecular weight when determined in benzene in a Mechrolab Osmometer of 2737±15%.

The poly[1,5-phenylene-1,5-bis(trimethylsilyl)-3-methylbiuret] of Example 1 was dissolved in benzene and to the benzene solution was added alcohol in a sufficient amount to effect hydrolysis of the trimethylsilyl groups. The hydrolyzed polymer started precipitating shortly after the alcohol was added at around room temperature (25–30° C.). The white material which formed after addition of the ethanol was removed by filtration, washed with ethanol and then dried. This product which had the formula (VII) 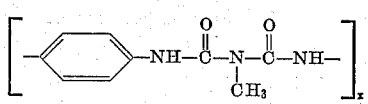

where x is a whole number in excess of 1, had no melting point and did not show evidence of decomposition until a temperature of about 400° C. This polymer was insoluble in alcohols, ethers, aromatic hydrocarbons, halogenated aromatic hydrocarbons, ketones, organic nitriles and other common solvents. It was, however, easily dissolved in dimethylsulfoxide and dimethylformamide.

Analyses of the polysilylbiuret and polybiuret of this Example 1 showed the following results for the elements where the values in parentheses are the theoretical values:

|  | Percent carbon | Percent hydrogen | Percent nitrogen | Percent silicon |
|---|---|---|---|---|
| Polysilylbiuret | 54.1 (53.7) | 7.5 (7.5) | 13.3 (12.5) | 15.4 (16.8) |
| Polybiuret | 55.0 (56.5) | 5.0 (4.7) | 19.8 (22.0) |  |

Example 2

N-allylhexamethyldisilazane [also known as bis(trimethylsilyl)allylamine] was prepared by mixing 57 grams of allylamine with 300 grams of triethylamine and 500 cc. of dry toluene and adding under anhydrous conditions 275 grams of trimethylchlorosilane to the mechanically stirred mixture. After about 30 minutes stirring, during which time the mixture became hot spontaneously and triethylamine hydrochloride precipitated, the mixture was heated at reflux temperature for seven hours, filtered and the filtrate fractionally distilled. There was thus obtained N-allylhexamethyldisilazane boiling at 72° C./15 mm. and having a refractive index $n_D^{20}=1.4420$.

Example 3

The polysilylbiuret of the formula (VIII) 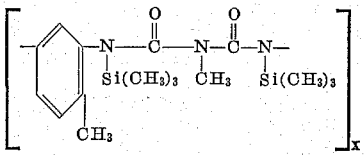

where x is a whole number in excess of 1 was prepared by mixing 3.48 grams of toluene-2,4-diisocyanate and 3.51 grams of bis(trimethylsilyl) methylamine with 3 grams of dry toluene. The exothermic reaction which resulted was completed by stirring the mixture under a protective atmosphere of nitrogen at 90° C. for 24 hours. This yielded a highly viscous solution which upon removal of the solvent yielded the above-described polysilylbiuret as a white solid.

Example 4

The polybiuret of the formula (IX) 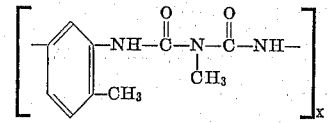

derived from the polysilylbiuret of Example 3, where x is a whole number in excess of 1, was obtained by the addition of alcohol to a solution of the polysilylbiuret of Example 3 in benzene or toluene. The polybiuret precipitated from the solid mixture within 30 minutes to form a white solid which was soluble in dimethylformamide, dimethylsulfoxide and similar solvents of high polarity but insoluble in common alcohols, ethers and hydrocarbons.

Example 5

The polysilylbiuret of the formula (X) 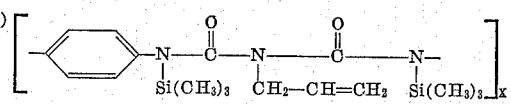

was prepared by mixing 4.11 grams bis(trimethylsilyl)-allylamine with 3.26 grams p-phenylene diisocyanate and 2 grams of a mixture of benzene and toluene. The addition reaction was carried out in the same way as was described in Example 3. The polysilylbiuret thus obtained was in the form of a white solid, which was soluble in aromatic hydrocarbons, ethers and other inert solvents.

Example 6

The polybiuret of the formula (XI) 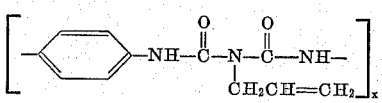

derived from Example 5 was obtained by hydrolysis in alcohol in the same manner as described in Example 4. The white, solid polymer was insoluble in hydrocarbons, alcohols and ethers, but easily soluble in solvents of high polarities such as N-methylpyrrolidone and the like.

Example 7

The polysilylbiuret of the formula (XII) 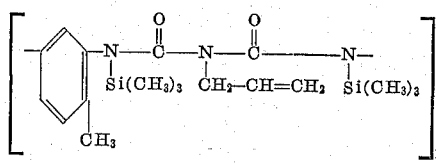

was obtained similarly described in Examples 3 and 5 by mixing 4.03 grams bis(trimethylsilyl)allylamine and 3.48 grams of toluene-2,4-diisocyanate with 3 grams of dry toluene, and stirring the mixture under dry nitrogen at 90° C. for 24 hours. After removing the solvent, the above-described polymer was obtained as a white powder having properties similar to the polysilylbiurets of Examples 3 and 5.

Example 8

The polybiuret of the polysilylbiuret of Example 7 having the formula (XIII) 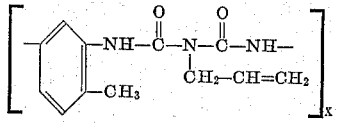

was obtained by alcoholysis of a solution of the polysilylbiuret of Example 7 in the same manner as was done in the preceding examples. This polybiuret had properties quite similar to the polymers of Examples 3, 5, and 6.

The polysilylbiurets and the polybiurets derived therefrom can be dissolved in various solvents many of which are mentioned above, to form solutions which can be cast into films by evaporation of the solvent. Films made from the polybiurets free of organosilyl groups have utility for packaging and protective applications. They are especially useful because of their infusibility at elevated temperatures for those applications where temperature resistance is an important requirement. Films of these polybiurets can be used as slot liners in motors and can also be employed as insulation for conductors. Furthermore, the polybiuret compositions herein disclosed may also be used as flexible or rigid diaphragms which are resistant to moisture and solvents. Suitable solvent-resistant hose and flexible tubing may be prepared by extrusion methods from the polysilylbiurets because of the fusibility and thereafter by suitable hydrolysis whereby the silyl groups are removed, one can then obtain infusible polybiurets. The compositions, both of the polysilylbiurets and the polybiurets, may also be mixed with other polymers, for instance, polyamide resins, Buna-N-rubbers, etc., to make products useful as wire insulation.

Various fillers and modifiers may be added to the polysilylbiurets or the polybiurets, among which may be mentioned, for instance, carbon black, zinc oxide, aluminum oxide, celite, asbestos, magnesium carbonate, mica, glass, etc. Such fillers may be added in amounts ranging, by weight, from 0.1 to 200 parts of filler per part of polymer. Suitable plasticizers may be added as may extenders of resins, for example, cumar, indene, and cumar-indene resins.

When extruding the polysilylbiurets into a humidified atmosphere in order to effect desilylation, i.e., removal of triorganosilyl groups, the fact that triorganosilyl groups form silanol groups which can then condense to form disiloxanes may be an advantage in applications such as fiber or film formation because, the fiber or film, if coated with such a disiloxane of sufficiently high molecular weight so it does not volatilize readily, can be used to make various cloths, fabrics, and other woven articles which already have a water-repellent film of the disiloxane thereon. Thus, one is able to make use of essentially all of the atoms in the polysilylbiuret in the formation of useful polybiurets.

It should be recognized that both the polysilylbiurets and the polybiurets derived therefrom will undoubtedly have a terminal group. Although I do not wish to be bound by this undestanding, nevertheless, it is believed that the terminnal groups, whether it be a polysilylbiuret chain or a polybiuret chain, may be either a group of the formula

or an —NCO group. In the case of the amine termination, one valence of the nitrogen is attached to the biuret chain, while the other valence of the nitrogen is satisfied by either a triorganosilyl group or a hydrogen atom, depending on whether one is dealing with a polysilylbiuret or a polybiuret. After hydrolysis, the —NCO will be converted to an —NH$_2$ group.

What I claim as new and desire to secure by Letters Patent of the United States is:

1. A solid composition of matter having the formula

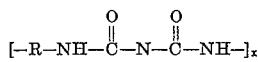

where R is a divalent organic radical, R" is a monovalent hydrocarbon radical selected from the class consisting of alkyl, alkenyl, and cycloaliphatic radicals, and $x$ is a whole number in excess of 1.

2. A solid composition of matter having the formula

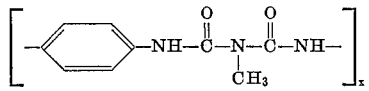

where $x$ is a whole number in excess of 1.

3. A solid composition of matter having the formula

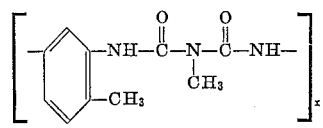

where $x$ is a whole number in excess of 1.

4. A solid composition of matter having the formula

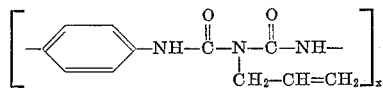

where $x$ is a whole number in excess of 1.

5. A solid composition of matter having the formula

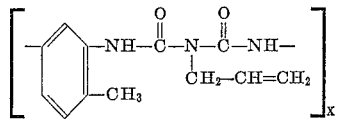

where $x$ is a whole number in excess of 1.

6. A process for making a solid composition of matter having the recurring structural unit

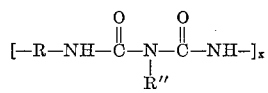

where $x$ is a whole number in excess of 1, which process comprises (1) reacting at a temperature of from 35° to 150° C. and on a molar ratio basis of about 1 mole of an organosilylamine of the formula

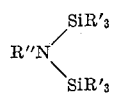

and about 1 mole of an organodiisocyanate of the formula OCN—R—NCO, where R is a divalent organic radical, R' is a monovalent hydrocarbon radical, and R" is a monovalent hydrocarbon radical selected from the class consisting of alkyl, alkenyl, and cycloalphatic radicals, and (2) thereafter hydrolyzing the reaction product of (1).

7. The process as in claim 6 wherein the diisocyanate is phenylene diisocyanate and the organosilylamine is bis(trimethylsilyl)methylamine.

8. The process as in claim 6 in which the diisocyanate is toluene-2,4-diisocyanate and the amine is bis(trimethylsilyl)methylamine.

9. The process as in claim 6, in which the diisocyanate is para-phenylene diisocyanate and the amine is bis(trimethylsilyl)allylamine.

10. The process as in claim 6 in which the diisocyanate is toluene-2,4-diisocyanate and the amine is bis(trimethylsilyl)allylamine.

References Cited

UNITED STATES PATENTS

| | | | |
|---|---|---|---|
| 2,907,782 | 10/1959 | Pike | 260—448.2 |
| 3,172,874 | 3/1965 | Klebe | 260—77.5 |
| 3,239,489 | 3/1966 | Fink | 260—77.5 |

FOREIGN PATENTS

| | | |
|---|---|---|
| 647,652 | 8/1962 | Canada. |
| 873,709 | 7/1942 | France . |
| 907,829 | 10/1962 | Great Britain. |
| 1,042,892 | 11/1958 | Germany. |
| 1,401,823 | 4/1965 | France. |

DONALD E. CZAJA, *Primary Examiner.*

F. McKELVEY, *Assistant Examiner.*

UNITED STATES PATENT OFFICE
CERTIFICATE OF CORRECTION

Patent No. 3,337,510     August 22, 1967

Johann F. Klebe

It is hereby certified that error appears in the above numbered patent requiring correction and that the said Letters Patent should read as corrected below.

Column 7, lines 48 and 49, the formula should appear as shown below instead of as in the patent:

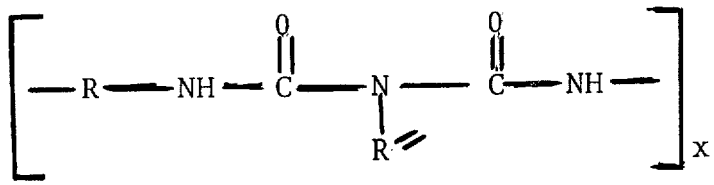

Signed and sealed this 15th day of October 1968.

(SEAL)
Attest:

Edward M. Fletcher, Jr.
Attesting Officer

EDWARD J. BRENNER
Commissioner of Patents